(12) United States Patent
Krofchak et al.

(10) Patent No.: US 6,231,767 B1
(45) Date of Patent: May 15, 2001

(54) TREATMENT OF PHOSPHATIC WASTES

(75) Inventors: David Krofchak, Copper Cliff; Roberto Berardi, Sudbury, both of (CA)

(73) Assignee: Claytech Enviromental Services Inc., Coppercliff (CA)

( * ) Notice: Subject to any disclaimer, the term of this patent is extended or adjusted under 35 U.S.C. 154(b) by 0 days.

(21) Appl. No.: 09/250,151

(22) Filed: Feb. 16, 1999

Related U.S. Application Data

(60) Provisional application No. 60/075,100, filed on Feb. 18, 1998.

(51) Int. Cl.[7] .................................. C02F 1/00; C02F 9/00
(52) U.S. Cl. ......................... 210/697; 210/906; 210/907; 423/155; 423/157.2; 423/157.4; 209/5; 209/10; 71/37; 71/40; 71/41; 588/2; 588/9; 588/14; 588/252
(58) Field of Search ..................... 210/697, 906, 210/907; 423/155, 157.2, 157.4; 209/5, 10; 71/37, 40, 41; 588/2, 9, 14, 252

(56) References Cited

U.S. PATENT DOCUMENTS

| | | |
|---|---|---|
| 3,418,237 * | 12/1968 | Booth et al. . |
| 3,761,239 * | 9/1973 | Cook et al. . |
| 3,763,041 * | 10/1973 | Cook et al. . |
| 4,217,212 * | 8/1980 | Deal . |
| 4,279,635 * | 7/1981 | Krofchak . |
| 4,690,752 * | 9/1987 | Shaw . |

* cited by examiner

*Primary Examiner*—Thomas M. Lithgow
(74) *Attorney, Agent, or Firm*—Robert F. Delbridge

(57) ABSTRACT

A process for treating thickened phosphatic clay suspensions, waste clay and phosphogypsum produced in the processing of phosphate ore by water beneficiation and chemical processing, the thickened phosphatic clay suspension having a solid content of from about 4 to about 40 percent by weight, includes mixing a sufficient amount of deflocculating agent with a thickened phosphatic clay suspension to cause deflocculation of the suspension to an extent sufficient to reduce the viscosity thereof to a value enabling the deflocculated suspension to be readily pumped from one location to another, the deflocculating agent comprising an alkali compound of a phosphorus oxide. The deflocculated suspension of reduced viscosity is pumped from one location to another and separated into a clay suspension and a phosphatic mineral and sand suspension. The non-clay minerals are dissolved in the phosphatic mineral and sand suspension in dilute sulfuric acid to separate a phosphatic fraction as phosphoric acid from a sand fraction. A cementitious material is produced by heating clay, phosphogypsum and sand in a kiln, and the cementitious material is mixed with the clay suspension and the sand fraction in an amount sufficient to cause the formation of large silicate molecules with resultant gelling and setting of the suspensions into an inert solid material.

6 Claims, 2 Drawing Sheets

TREATMENT OF PHOSPHATIC WASTES

Figure 1:
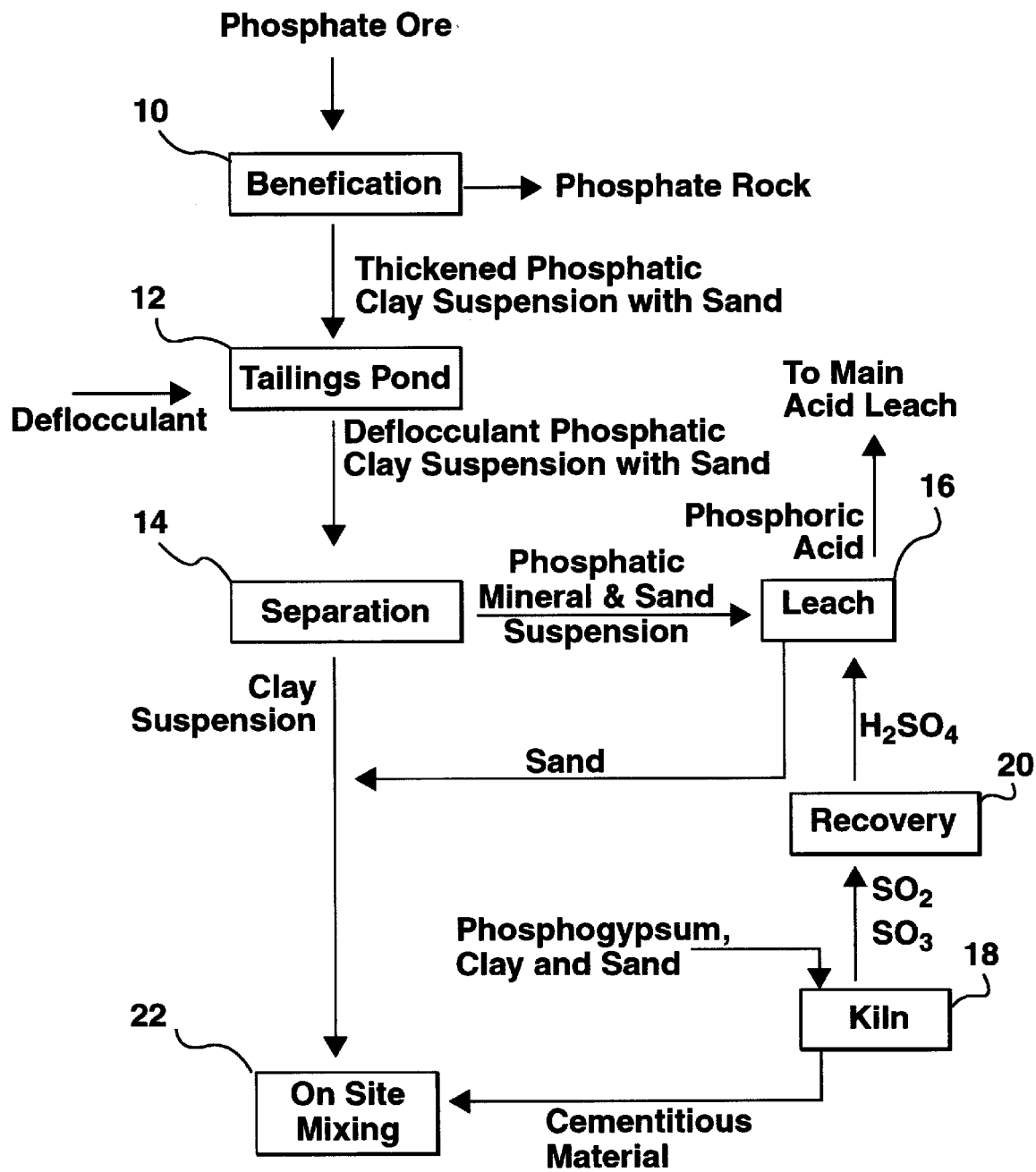

This application claims priority under 35 USC119(e) from U.S. provisional application Ser. No. 60/075,100 filed Feb. 18, 1998.

This invention relates to the treatment of wastes from the mining and processing of phosphate ores, namely waste clays, phosphogypsum and phosphatic clay suspensions, which are suspensions of phosphorous minerals, sand and clay.

BACKGROUND OF THE INVENTION

The mining and processing of phosphate ores create two types of wastes for which there has previously been no satisfactory use.

One of these wastes is phosphogypsum, which is a by-product of the phosphoric acid production process. For each ton of $P_2O_5$ produced, approximately five tons of phosphogypsum are also produced. To this date, more than 700 million tons have accumulated in Florida on at least 5000 acres, and phosphogypsum continues to accumulate there at an estimated rate of about 30 million tons per year. After phosphate rock has been reacted with sulfuric acid to produce phosphoric acid, resultant phosphogypsum is filtered and pumped as a slurry to ponds where it settles. As the gypsum settles out, a dragline moves a portion and deposits it on a dike, raising the height of the wall. This process is repeated and a "stack" is created. As the stack grows in height (up to 200 feet high) the area of the pond decreases until the available pond capacity becomes too small and the pumping height requires too much energy. At this stage therefore, the phosphogypsum stack reaches the end of its useful life and is ready to be closed.

The disposal, storage or handling of these stacks is of considerable concern, because the chemical processing of phosphate rock leaves and concentrates most of the radium, fluoride and traces of heavy metals present in the original phosphate rock, together with decay products such as radon, polonium and lead, in the phosphogypsum by-product. This logically directs attention to construction techniques which minimize the eventual emission of contaminants into structures on reclaimed lands and into the water. The goals of phosphogypsum stack reclamation are to control or minimize any environmental hazards and to improve the aesthetics.

Another of the wastes are phosphatic clays which are separated from the phosphatic ore (matrix) by washing during the upgrading (beneficiation) step. The diluted clay then flows into diked ponds (or settling areas) where the clay is allowed to settle. A survey by the Florida Department of Natural Resources, Bureau of Mine Reclamation, states that, as of December 1991, there were 102,000 acres of active and inactive clay settling areas in Florida, and that 23,000 additional acres were planned. Because of the physical properties of the clays, reclaimed clay settling areas are not suitable for urban or suburban development, However, the clays are highly fertile and thus clay settling areas do have a potential for agricultural uses. The clay settling areas could also serve as stream headwaters and provide wildlife habitat.

Approximately one ton of waste clay is generated for each ton of finished phosphate rock product isolated from the ore. Historically, the waste clay has been disposed of in above ground diked ponds where the diluted clay slowly settles through the action of gravity. This conventional method of handling the waste clays has several disadvantages. It may take up to 20 years before the clays settle from an initial 3 to 5% solids level to a 20% solids level. Even then the clays occupy twice the volume they originally did in the ground. Almost half of the acreage of a phosphate or processing site has to be devoted to storing the diked clays. When the clay ponds have settled to their maximum extent and crusted over, the resulting land has limited utilities. It is restricted to low income-producing applications such as cattle grazing or wildlife habitat. This adversely impacts the tax base and general economy.

The general public, recalling a few sizable retention pond dam breaks, is generally apprehensive about future dam failures, even though today's dams are carefully engineered and maintained. Also, the clays tie up vast amounts of process water for years. A fraction of this water evaporates and is not recovered. Further, an appreciable amount of phosphorous values is present in the suspended solids, and in fact the phosphorous concentration in the suspended solids may be of the same order as the phosphorous concentration in the suspended solids may be of the same order as the phosphorous concentration in the phosphate ore originally mined. Thus, at the present time, a significant amount of phosphorous values is not recovered.

A process for the treatment of phosphatic clay suspensions has been disclosed and claimed in U.S. Pat. No. 4,279,635 (Krofchak) issued Jul. 21, 1981, the content of which are hereby incorporated herein by reference.

This patent describes a process for treating thickened phosphatic clay suspensions produced in the processing of phosphate ore by water beneficiation, such suspensions having a solids content of from about 5% to about 30%. The process comprises mixing a sufficient amount of deflocculating agent with a suspension to cause deflocculation of the suspension to an extent sufficient to reduce the viscosity of the sludge to a value enabling the deflocculated suspension to be readily pumped from one location to another. The deflocculating agent comprises an alkali metal phosphate. The deflocculated suspension of reduced viscosity is pumped from one location to another, and an additive compound comprising an alkaline earth metal oxide or hydroxide is subsequently mixed with the deflocculated suspension in an amount sufficient to cause the formation of large silicate molecules with resultant gelling and setting of the sludge into an inert solid material.

The patent only addresses liquefying the clay sufficiently to pump it to a fill location, where it is solidified with purchased reagents such as lime and cement. The patent does not in any way teach the full scope of problems such as disposal and/or utilization of the huge quantities of phosphogypsum or the manufacture of chemical reagents such as cement and/or acid to recover phosphorous compounds into a saleable form.

It is therefore an object of the present invention to unify all the waste problems associated with phosphate mining in a manner which achieves a more economical solution which the prior patent referred to above does not teach.

SUMMARY OF THE INVENTION

The present invention provides a process for treating thickened phosphatic clay suspensions, waste clay and phosphogypsum produced in the processing of phosphate ore by water beneficiation and chemical processing, such clay suspensions having a solid content of from about 4 to about 40%.

The process comprises mixing a sufficient amount of deflocculating agent with a thickened phosphatic clay suspension to cause deflocculation to an extent sufficient to reduce the viscosity thereof to a value enabling the deflocculated suspension to be readily pumped from one location to another, the deflocculating agent comprising an alkali compound of a phosphorous oxide, pumping the deflocculated suspension of reduced viscosity from one location to another, separating the deflocculated suspension into a clay suspension and a phosphatic mineral and sand suspension, dissolving the non-clay minerals in the phosphatic mineral and sand suspension in dilute sulfuric acid to separate a phosphatic fraction as phosphoric acid from a sand fraction, producing a cementitious material by heating clay, phosphogypsum and sand in a kiln, and mixing the cementitious material with the clay suspension and the sand fraction in an amount sufficient to cause the formation of large silicate molecules with resultant gelling and setting of the suspensions into an inert solid material.

Sulfur dioxide and sulfur trioxide liberated in the production of the cementitious material can be recovered to produce dilute sulfuric acid which can be used to separate the phosphatic fraction from the sand fraction in the deflocculated suspension. The phosphoric acid can be passed to a main acid leaching for refining the phosphate rock or can be used to produce phosphate products such as calcium phosphatic dibasic, magnesium ammonium phosphate or any other product apparent to those skilled in the art.

The combination of deflocculation, separation and solidification steps in accordance with the invention is an unexpectedly successful solution to the problem mentioned earlier with respect to the disposal of such suspensions in settling areas, waste clays and phosphogypsum in stacks, since every waste is used to produce phosphate products in an environmentally friendly manner. The solution provided by the invention can be both economical and technically successful. The recovered dilute sulfuric acid may also be absorbed in an absorption tower by the liquified clay itself to produce a very stable resultant solid material which may be used as fill, for example to backfill the area from which the phosphate rock is originally mined or to reclaim the lands of the ponds where the clay was allowed to settle. The heavy metals and contaminants which were in the phosphogypsum can also be reabsorbed and put back underground with any environmental hazard reduced to a minimum.

After the deflocculation step, the deflocculated suspension can be pumped from a temporary settling area to a location where the clay minerals will be separated from the non-clay minerals, because the non clay-minerals, being phosphatic fraction and sand fraction, settle at the bottom, while the clay minerals stay in suspension. The clay minerals can be pumped where fill is desired. The cementitious material may be mixed with the clay minerals while the suspension is being pumped to the site where it may be used as fill. If desired, the amount of cement added may be the maximum possible to produce a product of greater strength suitable for use as road base material or other load supporting use.

If desired, a controlled amount of sulfuric acid or phosphoric acid may be added to the deflocculated suspension before gelling and setting to convert phosphorous compounds in the suspension to compounds which act as agricultural fertilizer. This step may be carried out in the production of the cement from phosphogypsum, clay and sand in the kiln. The sulfur dioxide and sulfur trioxide liberated in the reaction between phosphogypsum and silica may be absorbed in a absorption tower by the clay and become more reactive.

The non-clay minerals are composed mainly of a phosphatic fraction and a sand fraction. The phosphatic fraction can be separated from the sand fraction by dissolution with dilute sulfuric acid as phosphoric acid, as indicated above. The phosphorous values may be sent to the main leach plant or may be precipitated as calcium phosphate dibasic using milk of lime, as magnesium ammonium phosphate using ammonia, or as any other product known to those skilled in the art.

The economic advantages of recovering such phosphatic material, which previously had been left in the settling areas, are self-evident.

The sand fraction left after dissolution of the phosphatic fraction can be added to the deflocculated suspension before, during or after mixing with the cementitious material and, if desired, additional sand may be added therewith to increase the silica content. The amount of sand added may be from about 4% to about 500% by dry weight of suspension.

This invention advantageously makes use of waste clay, clay suspensions, phosphogypsum and sand to produce a cementitious material to solidify clay suspensions after phosphate removal, reclaim land from clay ponds and mine pits and eliminate the eventual hazard of the phosphogypsum.

Figure 2:
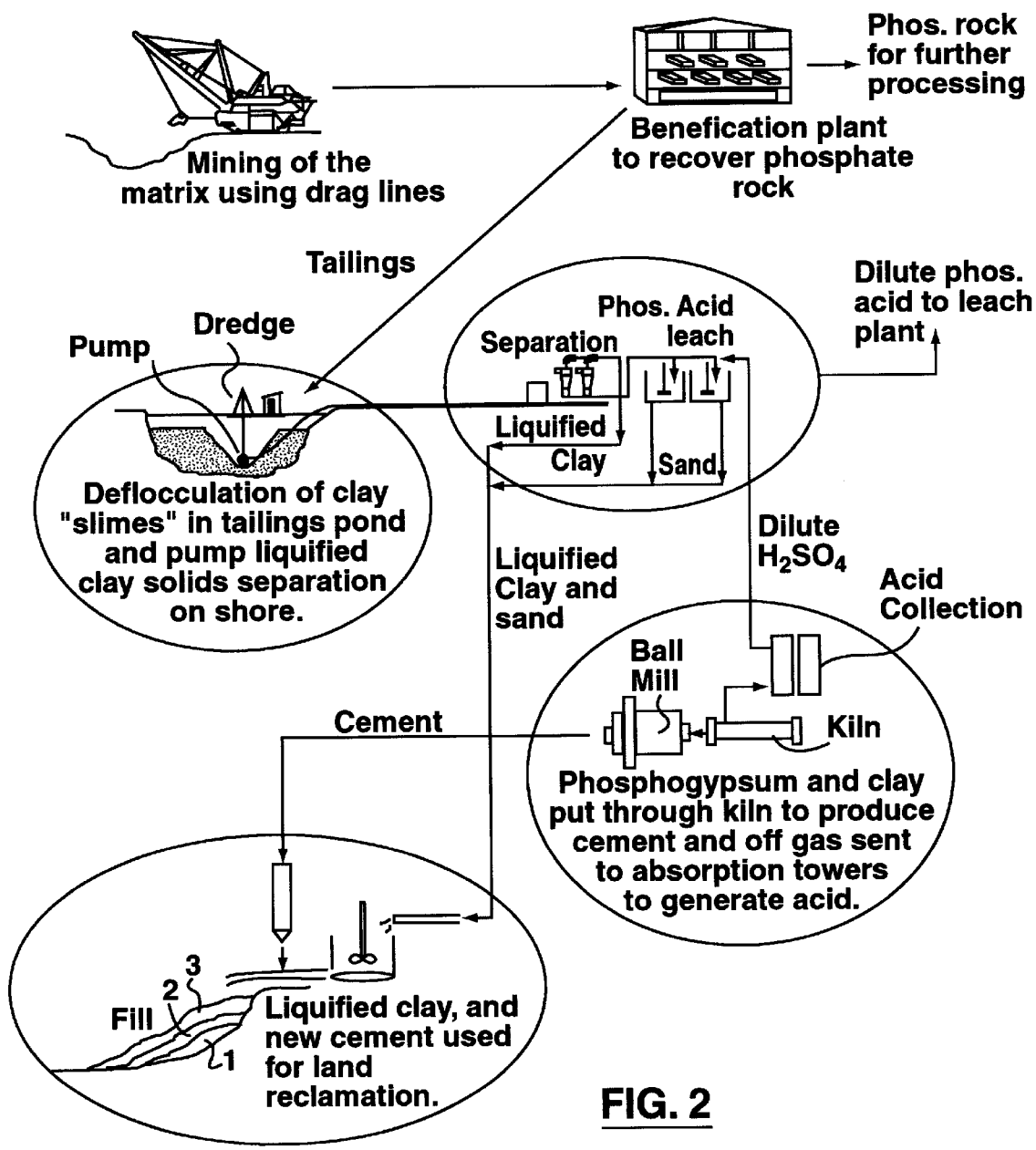

One embodiment of the invention will now be described, by way of example, with reference to the accompanying drawings of which:

FIG. 1 is a schematic view of a process for treating a thickened phosphatic clay suspension, waste clay and phosphogypsum produced in the processing of phosphate ore by water beneficiation and chemical processing, and FIG. 2 is a semi-pictorial view of the process.

Referring to the drawings, and in particular to FIG. 1, phosphate ore is treated in a beneficiation step 10 which produces phosphate rock, waste clay and a thickened phosphate clay suspension containing phosphorous minerals, sand and clay. The phosphate rock is separated from the remaining material and is further processed, and the remaining material is passed to a tailings pond 12. Such treatment of phosphate ore is conventional.

In accordance with the invention, a deflocculating agent comprising sodium tripolyphosphate is added to the tailings pond 12 in an amount of from about 0.03 to about 0.6 percent of dry weight of the thickened phosphate clay suspension therein to cause deflocculation of the suspension to an extent sufficient to reduce the viscosity of the suspension to a value which enables the suspension to be readily pumped from the tailings pond 12.

The deflocculated phosphatic clay suspension is then pumped to a separation step 14 which produces a phosphatic mineral and sand suspension and a clay suspension. The phosphatic mineral and sand suspension is passed to a leach step 16 where this suspension is leached with dilute sulphuric acid (obtained in a manner which will be described later) to convert the phosphorous values to phosphoric acid. The phosphoric acid is sent to a phosphate rock acid leach step (not shown). Alternatively, the phosphoric acid can be used to produce calcium phosphate dibasic, magnesium ammonium phosphate or other phosphate product as will be readily apparent to a person skilled in the art. The clay suspension from the separation step 14 and the sand from the leach step 16 are used in a manner to be described later.

Phosphogypsum produced in further processing of the phosphate rock (in known manner), clay and sand are heated in a kiln 18 to produce cement and off-gases containing sulphur dioxide and sulphur trioxide. The off-gases are treated in a recovery step 20 to produce sulphuric acid which is used in the leach step 16.

The clay suspension from the separation step 14 together with sand from the leach step 16 is passed to the final desired location 22 and cement from the kiln 18 is mixed therewith in an amount sufficient to cause formation of large silicate molecules and resulting gelling and setting of the suspension into an inert solid material. A semi-pictorial view of the process is shown in FIG. 2.

Examples of the invention will now be described.

EXAMPLE 1

A composite sample of phosphatic clay was collected from a clay pond in Florida, and a charge thereof was mixed in a blender. The mix was so thick that the blades of the blender were causing cavitation at to the bottom of the mix, but at the top it was undisturbed. A spoon was able to stand by itself.

Sodium tripolyphosphate @5% solution was added to the charge while it was mixing and immediately the charge liquefied, becoming like water. The charge was then allowed to settle for 5 minutes. It was noted that the clay minerals stayed in suspensions, while the non-clay minerals dropped down to the bottom of the blender. The clay minerals were poured in a jar, leaving the non-clay minerals in the blender.

The clay minerals were separated from the non-clay minerals. The non-clay minerals were composed of a phosphatic fraction and a sand fraction (silica sand).

In order to separate the phosphatic fraction from the sand fraction, the non-clay minerals were put in sulfuric acid @10% sol. by weight. The phosphatic fraction was recovered as dilute phosphoric acid and poured in a jar. The phosphoric acid was then selectively precipitated with milk of lime, in order to produce calcium phosphate dibasic, and after filtration, it was precipitated with ammonia, in order to produce magnesium ammonium phosphate.

The phosphate fraction was separated from the sand fraction. The sand was mixed with a liquified clay and then a cementitious material made by calcining phosphogypsum sand and clay, was added (10% of the charge) in order to solidify the charge. The charge was then poured into a mold and grass seeds were spread on top of it. After a couple of days the grass started to grow and, after one week, all the surface of the solidified charge, now resembling a typical natural soil, was covered by grass. The grass kept on growing even after 8 months as in any typical garden.

Chemical analysis of solids and solutions at various stages in the process are shown in following tables IA & IB respectively.

TABLE IA

| Sample | $P_2O_5$ % | $Al_2O_3$ % | CaO % | MgO % | $SiO_2$ % |
|---|---|---|---|---|---|
| Original Clay | 8.74 | 4.23 | 13.54 | 2.16 | 54.46 |
| Sample After Treatment (sand) | 0.02 | 3.04 | 1.27 | 0.02 | 92.29 |
| Calcium Phosphate Dibasic | 19.86 | 1.49 | 34.41 | 1.24 | 0.36 |
| Mg Ammonium Phosphate | 45.87 | 0.02 | 12.85 | 19.73 | 2.06 |

TABLE IB

| Solution | P mg/l | Al mg/l | Ca mg/l | Mg mg/l | Si mg/l |
|---|---|---|---|---|---|
| Dilute Phosphoric Acid | 4980 | 218 | 684 | 1710 | 178 |
| Sol. After Precipitation of Phos. with Milk of Lime | 2280 | <1 | 869 | 1500 | — |
| Sol. After Precipitation of Phos. with Ammonia | <1 | <1 | 27.3 | 5.9 | — |

EXAMPLE 2

This example was designed to show the strength development of the product of example 1 when the charge was poured into 2"×4" cylinders. The uniaxial compressive strength was measured with a proving ring/load cell. The results are shown in the following Table II.

TABLE II

| | Compressive Strength in Psi | | | |
|---|---|---|---|---|
| Sample No. | 3 Day | 7 Day | 28 Day | 90 Day |
| #1 | 29.7 | 64.9 | 232 | 244.3 |
| #2 | 53.7 | 89 | 245.7 | 261 |
| #3 | 22.8 | 62 | 215.1 | 223 |

The samples did not fall apart when immersed in water.

EXAMPLE 3

In this example 2"×2" cubes were made using the sand recovered after separation and dissolution of the phosphate fraction and the cementitious material made by calcining clay and phosphogypsum. The amount of cementitious material was increased to reach a higher compressive strength for load supporting use.

When heated and mixed in the right proportion the silica contained in the clay reacts with the phosphogypsum giving a cementitious material that doesn't comply the standards for the cement industry, but it is more than satisfactory for the solidification purposes related with the invention:

$$CaSO_4 + SiO_2 \rightarrow CaO.SiO_2 + SO_3\uparrow$$

The $SO_3$ is then collected in absorption towers to make a dilute sulfuric acid to dissolve the phosphate as phosphoric acid and separate it from the sand fraction. This off gas is not only composed of the $SO_3$ but also if the other off gas eventually contained in the phosphogypsum. As dilute sulfuric acid, this off gas would be absorbed and diluted by the liquefied clay in the solidification step (as they were before the mining process). The results are shown in the following Table III.

TABLE III

| Sample No. | Composition | Compressive Strength in MPa | | |
|---|---|---|---|---|
| | | 7 Days | 28 Days | 90 Days |
| #4 | 687.5 g sand<br>100 g cementitious material<br>48 g water | 8.8 | 16.8 | 27 |
| #5 | 687.5 g sand | 12.2 | 23.1 | 33 |

TABLE III-continued

| Sample No. | Composition | Compressive Strength in MPa | | |
|---|---|---|---|---|
| | | 7 Days | 28 Days | 90 Days |
| #6 | 200 g cementitious material<br>96 g. water<br>687.5 g sand<br>400 g cementitious material<br>144 g water | 20.2 | 38.7 | 46.8 |

Other embodiments and examples of the invention will be readily apparent to a person skilled in the art, the scope of the invention being defined in the appended claims.

We claim:

1. A process for treating thickened phosphatic clay suspensions, waste clay and phosphogypsum produced in the processing of phosphate ore by water beneficiation and chemical processing, said thickened phosphatic clay suspension having a solid content of from about 4 to about 40 percent by weight, the process comprising:

mixing a sufficient amount of deflocculating agent with a thickened phosphatic clay suspension to cause defloc-culation of the suspension to an extent sufficient to reduce the viscosity thereof to a value enabling the deflocculated suspension to be readily pumped from one location to another, the deflocculating agent comprising an alkali compound of a phosphorus oxide, pumping the deflocculated suspension of reduced viscosity from one location to another, separating the deflocculated suspension into a clay suspension and a phosphatic mineral and sand suspension, dissolving the non-clay minerals in the phosphatic mineral and sand suspension in dilute sulfuric acid to separate a phosphatic fraction as phosphoric acid from a sand fraction, producing a cementitious material by heating clay, phosphogypsum and sand in a kiln, and mixing the cementitious material with the clay suspension and the sand fraction in an amount sufficient to cause the formation of large silicate molecules with resultant gelling and setting of the suspensions into an inert solid material.

2. A process according to claim 1 wherein the amount of cementitious material produced by heating clay, phosphogypsum and sand is from about 0.04% to about 60% sufficient cause the liquefied clay suspension to gel and set or to ensure load supporting use.

3. A process according to claim 2 wherein the production of the cementitious material produces as a by-product a dilute sulfuric acid which is used to separate the phosphatic fraction from the sand fraction or is reabsorbed by the clay suspension before solidification to make it more reactive.

4. A process according to claim 1 wherein the deflocculating agent is added in an amount of from about 0.03 to about 0.6% of dry weight of the thickened phosphatic clay suspension.

5. A process according to claim 1 wherein additional sand is added to increase the silica content of the solidified material in an amount of from about 4 to about 500% of dry weight of the deflocculated suspension.

6. A process according to claim 1 wherein the phosphoric acid produced after dissolution with dilute sulfuric acid can be sent to a main leach plant or used to produce a phosphatic product selected from the group consisting of calcium phosphate dibasic and magnesium ammonium phosphate.

* * * * *